March 6, 1951     J. L. WHITTAKER     2,544,624
THREE-DIMENSIONAL OSCILLOGRAPH SYSTEM
Filed Feb. 20, 1948
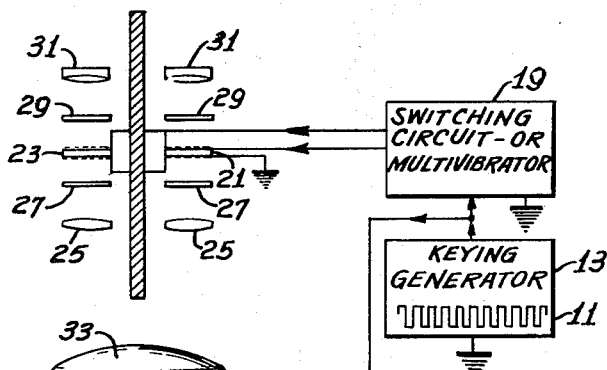
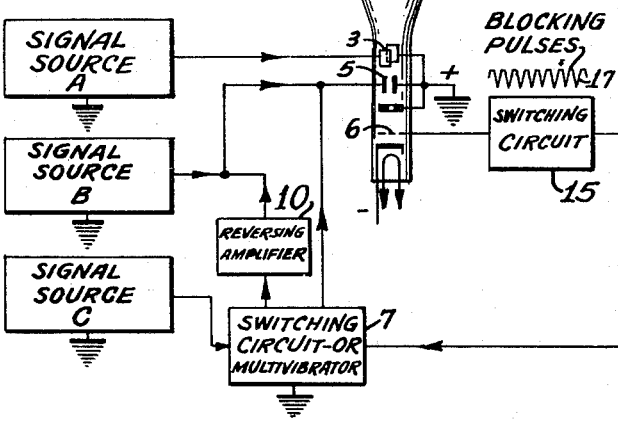
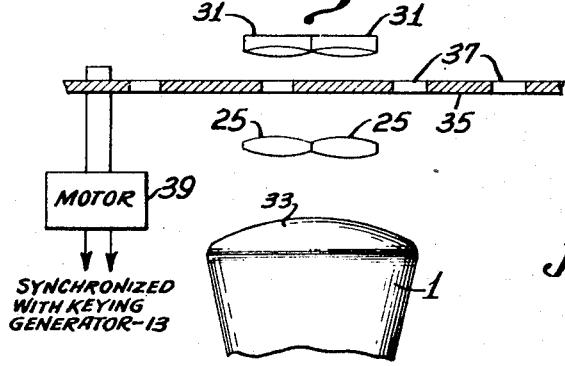
INVENTOR.
*James L. Whittaker*
BY
*Conder C. Henry*
ATTORNEY Patented Mar. 6, 1951

2,544,624

UNITED STATES PATENT OFFICE 2,544,624

THREE-DIMENSIONAL OSCILLOGRAPH SYSTEM

James L. Whittaker, Princeton, N. J., assignor to Radio Corporation of America, a corporation of Delaware Application February 20, 1948, Serial No. 9,784

6 Claims. (Cl. 177—351)

This invention relates to three dimensional viewing devices and more particularly to methods and devices of that class utilizing cathode ray tubes to give indications of three variables having stereoscopic relationships.

With the rapid development of improvements in electronic systems wherein it is possible to study, by means of cathode ray tubes, indications which are functions of numerous variables, it soon became known that there are many sets of three variables which are mutually dependent. An outstanding example of such a set of variables is the apparent position of a body in space. Such position may be readily fixed, in relation to an observer, by citing three variables, namely, azimuth, range, and elevation. Other examples are those of temperature, pressure and volume; mathematical functions; reactive and resistive components in electro-acoustic transducers, with respect to frequency; electrodynamic characteristics of thermionic tubes and the like; and electric or magnetic fields in space.

By means of the horizontal and vertical ray control elements of a cathode ray tube or their equivalent magnetic ray positioning means, it is a simple matter to show upon the luminous surface of the tube an indication whose position will vary as a function of any two of the aforementioned variables. Since the information is desired in terms of three variables and since the luminous surface of a cathode ray tube is normally such as lends itself to only two dimensions, it becomes necessary to add a third dimension which will vary as a function of the third variable.

One means of indicating the third variable which has been suggested has been by the intensity of the indication. Such proposals have been unsatisfactory because of the need for long practice and skilled readers or by the use of light intensity comparison methods to interpret the brightness in terms of the variable under consideration.

A more practical solution that has been offered is that which utilizes the stereoscopic effect produced by reason of our binocular vision wherein one eye receives a slightly different aspect of an object than does the other eye. One such electronic system is that disclosed in U. S. Patent 2,408,050, granted September 24, 1946, to L. A. De Rosa, wherein the same signal, slightly displaced in space, is presented on two cathode ray tubes which are viewed stereoscopically.

The prior art systems of which applicant is aware have not been completely satisfactory in that they require a multiplicity of cathode ray tubes together with their associated apparatus to produce a stereoscopic effect.

Furthermore, prior art systems have failed to give a true geometric perspective but merely an indication of an object having some depth.

Accordingly, it is an object of my invention to provide a three dimensional oscillograph indicator requiring only one cathode ray tube.

It is a further object of my invention to provide a stereoscopic oscillograph system and method in which the variables under consideration will appear in their true geometric perspective Another object of my invention is the provision of a method of and system for applying potentials which vary as functions of three variables to a single cathode ray tube so that the resultant indications are representative of a stereoscopic view of the three variables in their true geometric relationship.

Briefly, I achieve these objects by applying to one set of deflecting elements of a cathode ray tube potentials which vary as a function of a first variable. A second potential, the polarity of which is cyclically reversed and which varies in accordance with a second variable, is applied to the other set of deflecting elements of the tube. A third potential of cyclically reversing polarity and which varies as a function of the third variable is also applied to the second set of deflecting elements. The resulting effect on the cathode ray beam is to produce twin alternate indications which when viewed stereoscopically give a three-dimensional effect.

The above and other objects and advantages of my invention will become apparent upon a consideration of the following detailed description of an embodiment of the invention taken in conjunction with the accompanying drawing in which:

Fig. 1 represents diagrammatically a cathode ray tube circuit and associated apparatus in accordance with the invention.

Fig. 2 represents a modified viewing device used in conjunction with the invention, and Fig. 3 represents an enlarged view along the line 3—3 of Fig. 2.

Referring to Fig. 1, there has been provided a cathode ray tube 1 having a first set of deflecting elements 3, a second set of deflecting elements 5, and an intensity control element or grid 6. To the first set of deflecting elements there are applied potentials from signal source A which vary as a function of one variable under consideration. Similarly, to the second set of deflecting elements, there are applied potentials from signal source B which vary as a function of a second variable under consideration. The potentials from signal source C, representing the third variable under consideration, are applied to a switching circuit or multivibrator 7. Such circuits are well known in the art and any suitable type, either electronic or mechanical, may be utilized.

A keying generator 13 is provided as a source of signals 11 of square wave form, which are utilized to control the operation of the switching circuit. The switching circuit 7 alternately directs the potentials from signal source C to the deflecting electrode 5 of the cathode ray tube either directly or through a polarity reversing amplifier 10.

The signals from the keying generator 13 are also applied to a pulse forming switching circuit 15 to provide a second pulse train 17 which is applied to the grid 6 of the cathode ray tube whereby the signal is blanked during the interval when the first switching circuit 7 is reversing the polarity of the potentials from signal source C.

The output from the keying generator 13 is also fed to a third switching circuit, or multivibrator 19.

A suitable optical system for stereoptically viewing the images appearing on the cathode ray tube comprises a pair of bi-refringent crystals 21, 23, each having associated therewith an objective lens 25, a pair of crossed Polaroid films 27, 29, and an eyepiece 31.

Referring now to Figs. 2 and 3 there is shown a modified form of optical system wherein a rotating shutter 35 is interposed between the eyepieces 31, and the objective lenses 25. The disc includes a plurality of apertures 37 which alternately expose the different eyepieces to the image on the screen 33 of the cathode ray tube. By providing a large number of apertures in the rotating shutter a low speed motor 39 may be employed to drive the shutter. Any desired means may be used for synchronizing the speed of the driving motor with the keying generator 13, such, for example, as by common operation from the same 60 cycle source.

A consideration of the effects of the potentials from signal sources A, B and C will make the manner of operation of my invention clear. For the purposes of simplifying the explanation, however, it will be assumed that the three variables under consideration are elevation, azimuth and range and that signals indicative thereof are obtained from sources A, B and C, respectively. Furthermore, it will be assumed that the deflecting elements 3 produce deflection in a plane perpendicular to the drawing, hereinafter referred to as vertical deflection, while the other deflecting elements 5 produce deflections across the drawing, hereinafter referred to as horizontal deflection. Also, for purposes of simplification, the operation of my invention will be described in connection with showing a single point in space. It will be apparent that a finite object in space may be represented by a number of points and that the advantages of the invention are equally adaptable to the production of stereoscopic images of such objects.

The potential from signal source A (elevation) will cause a vertical deflection directly proportional to the elevation of the object under consideration. Simultaneously, the potential from signal source B (azimuth) will cause a horizontal deflection proportional to the azimuth of the object. The resultant position taken by the cathode ray beam will be indicative of these two variables. To give a stereoscopic effect, it is only necessary to provide a second corresponding image similar to the first indication but displaced therefrom and to provide means for viewing the indications stereoptically. However, in order that the object may appear in its true geometric perspective relative to the observer, it is necessary that the displacement between the two indications be made to vary as a function of the distance of the object from the observer, or its range.

The production of the second, similar indication and its displacement from the first indication are accomplished, in accordance with the invention by means of signal source C (range) being applied through the switching circuit 7. Assuming the switching circuit to be in such a position as to connect signal source C directly to the deflecting electrode 5, its effect will combine with that from source B and produce a horizontal displacement which will vary as both the azimuth and the range. At the next switching operation of the switching circuit 7, the potential from signal source C passes through the reversing amplifier, 10, reversing its polarity. Thus there will be produced a new indication on the screen 33 of the cathode ray tube which will have the same degree of vertical deflection but which will be displaced from the first indication an amount dependent upon the range of the object. There will thus be provided alternately two similar indications on the screen of the cathode ray tube which, when viewed stereoptically, will indicate the true geometrical relationship between object and observer.

In order to prevent the cathode ray beam from producing a confusing trace on the screen of the tube when switching occurs between the two indications, the blocking pulses from switching circuit 15 are applied to the grid of the cathode ray tube during such switching periods. These pulses are of sufficient magnitude as effectively to block the cathode ray beam during the switching operation.

It is well known in the art that the application of a high voltage to a bi-refringent crystal rotates its plane of polarization 90 degrees. Advantage of this fact is taken in the optical system shown in Fig. 1. The keying generator 13 is connected to the switching circuit 19 so as to apply, alternately, a high biasing potential to the electrodes of the bi-refringent crystals 21, 23. The Polaroid films 27, 29 are so arranged in relation to their corresponding crystal that a path for light is provided through one series at such time as the corresponding indication on the screen of the cathode ray tube is in line with it, while at the same time, light is blocked from passing through the other side of the optical system. By means of the switching circuit 19, the voltages are applied alternately to the crystals 21, 23, and thus the two indications are viewed separately, one by each eye of the observer.

In order to give an apparent steady indication the keying generator preferably should have a frequency of at least 30 cycles per second. Under these conditions, the persistence of vision will eliminate flicker.

The bi-refringent crystals of the above optical system may consist, for example, of Zinc Blende or PN commercial crystals comprising ammonium dihydrogen phosphate $(NH_4)H_2PO_4$. If of the latter material, the crystals should be of Z cut.

Connections to the crystals preferably are made through electrodes of any conductive material such as a metal or silicon carbide deposited in any known manner in an extremely thin, substantially transparent layer on opposite crystal faces.

It will be apparent that, if desired, Kerr cells may be substituted for the bi-refringent crystals and operated in the same manner by suitable high biasing voltages from the switching circuit 19.

An alternative optical system may be one such as is shown in Figs. 2 and 3. This mechanical system merely interposes a shutter alternately between the observer's lines of sight so that each eye sees only the image directed to it. It will be understood that the shutters are arranged to be open at such time as the proper indication is present on the screen of the cathode ray tube.

It will thus be clear that my invention provides a simple electronic system in which a third dimensional characteristic in an observed image is provided by changing the horizontal separation of corresponding points in the two alternately observed images on an oscilloscope as a function of the corresponding value in the third dimension.

While I have described my invention with particularity, it will be understood that various modifications in the arrangement and use of apparatus may be made without departing from the spirit of the invention. Having described my invention, I claim:

1. A stereoscopic oscillographic system for three indeterminable variables including a cathode ray oscilloscope having cathode ray generator means, vertical and horizontal ray deflecting elements and a ray intensity element, means establishing a potential on one of said deflecting elements as a function of one of said variables, means establishing a potential on the other of said deflecting elements as a function of a second of said variables, means cyclically reversing the polarity of said second mentioned potential, and means varying said second mentioned potential as a function of the third of said variables to provide indications of said variables having stereoscopic characteristics.

2. A stereoscopic oscillographic system for three indeterminable variables including a cathode ray oscilloscope having cathode ray generator means, vertical and horizontal ray deflecting elements and a ray intensity element, means establishing a potential on one of said deflecting elements as a function of one of said variables, means establishing a potential on the other of said deflecting elements as a function of a second of said variables, means cyclically reversing the polarity of said second mentioned potential, means blanking said cathode ray during said reversal of polarity, and means varying said second mentioned potential as a function of the third of said variables to provide indications of said variables having stereoscopic characteristics.

3. A stereoscopic oscillographic system for three indeterminable variables including a cathode ray oscilloscope having cathode ray generator means, vertical and horizontal ray deflecting elements and a ray intensity element, means establishing a potential on one of said deflecting elements as a function of one of said variables, means establishing a potential on the other of said deflecting elements as a function of a second of said variables, means cyclically reversing the polarity of said second mentioned potential, means blanking said cathode ray during said reversal of polarity, means varying said second mentioned potential as a function of the third of said variables and means synchronizing said reversing and blanking means to provide indications of said variables having stereoscopic characteristics.

4. A stereoscopic oscillographic system for three indeterminable variables including a cathode ray oscilloscope having cathode ray generator means, vertical and horizontal ray deflecting elements and a ray intensity element, a first source of potential which varies as a function of one of said variables connected to said vertical deflecting elements, a second source of potential which varies as a function of a second of said variables connected to said horizontal deflecting elements, a third source of potential which varies as a function of the third of said variables connected to said horizontal deflecting elements, means connected between said third source of potential and said horizontal deflecting elements cylically reversing the polarity of said third potential and means connected to said ray intensity element blanking said cathode ray during said reversal of polarity to provide indications of said variables having stereoscopic characteristics.

5. A stereoscopic oscillographic system for three indeterminable variables including a cathode ray oscilloscope having cathode ray generator means, vertical and horizontal ray deflecting elements and a ray intensity element, a first source of potential which varies as a function of one of said variables connected to said vertical deflecting elements, a second source of potential which varies as a function of a second of said variables connected to said horizontal deflecting elements, a third source of potential which varies as a function of the third of said variables connected to said horizontal deflecting elements, means connected between said third source of potential cyclically reversing the polarity of said third potential, means connected to said ray intensity element blanking said cathode ray during said reversal of polarity and means synchronizing the operation of said reversing and blanking means to provide indications of said variables having stereoscopic characteristics.

6. Stereoscopic apparatus comprising in combination a source of indications, a source of voltage pulses, circuit means connecting said voltage pulses to said source of indications in cyclically reversed potentials whereby said indications are alternately presented to view, an optical path for each of said indications, each of said paths including a bi-refringent crystal, and circuit means connecting said voltage pulses to said crystals in cyclically reversed potentials varying in synchronism with the potentials applied to said source of indications, whereby said optical paths are cyclically and alternately made transparent and blocked in synchronism with the alternate presentation of said indications.

JAMES L. WHITTAKER.

REFERENCES CITED

The following references are of record in the file of this patent:

UNITED STATES PATENTS

| Number | Name | Date |
|---|---|---|
| 2,417,446 | Reynolds | Mar. 18, 1947 |
| 2,426,979 | Ayres | Sept. 9, 1947 |